(12) United States Patent
Yoshimura et al.

(10) Patent No.: US 6,202,289 B1
(45) Date of Patent: Mar. 20, 2001

(54) MANUFACTURING PROCESS OF THIN FILM MAGNETIC HEAD SLIDERS

(75) Inventors: Kuniaki Yoshimura; Shinji Furuichi, both of Ohyahonmachi; Takeo Sasaki, Kumagaya, all of (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 09/330,992

(22) Filed: Jun. 14, 1999

(30) Foreign Application Priority Data

Oct. 30, 1998 (JP) .................................................. 10-309724

(51) Int. Cl.$^7$ .................................................. G11B 5/127
(52) U.S. Cl. .................................... 29/603.12; 29/603.15
(58) Field of Search ........................... 29/603.12, 603.04, 29/603.14, 603.15, 603.16

(56) References Cited

U.S. PATENT DOCUMENTS 4,489,484 * 12/1984 Lee ........................................ 29/603

5,718,035   2/1998  Yamanaka et al. .
5,745,979   5/1998  Fontana, Jr. et al. .

FOREIGN PATENT DOCUMENTS 3-295017   12/1991  (JP) .
8-241514    9/1996  (JP) .

* cited by examiner

*Primary Examiner*—Lee Young

(57) ABSTRACT

A manufacturing method that can manufacture small thin film magnetic head sliders with high dimensional accuracy and high manufacturing yield is disclosed. This manufacturing method uses 5 inch- or 6 inch-dia. substrate wafers having a thickness sufficient to keep wafer bending to a minimum level even after thin film magnetic head elements have been formed on it. On the front side surface of the substrate wafer formed are thin film magnetic elements. After a protective layer covered on the surface of the thin film magnetic head elements has been ground and/or lapped, the back side surface of the substrate wafer is ground and/or lapped to a thickness equal to a desired slider length.

4 Claims, 3 Drawing Sheets

MANUFACTURING PROCESS OF THIN FILM MAGNETIC HEAD SLIDERS

BACKGROUND OF THE INVENTION

1. Field of the Invention

This invention relates generally to a manufacturing process of thin film magnetic head sliders, and more specifically to a manufacturing process of thin film magnetic head sliders having high reliability and improved manufacturing yields.

2. Description of the Related Art

As a magnetic head for use in recording and reading information on a magnetic disk, a thin film magnetic head formed by laminating a thin film on the trailing side surface of a slider made of a non-magnetic material, such as alumina titanium carbide is commonly used. A known manufacturing method of a slider having a thin film magnetic head, that is, a thin film magnetic head slider, is such that a thin film magnetic head slider is obtained by forming a few hundreds of thin film magnetic head elements (electromagnetic conversion elements) on an end face, that is a front side surface, of a disk-shaped substrate wafer, with the thin film deposition technologies, slicing the substrate wafer into rectangular blocks (row bars) in such a manner that each of row bars includes about ten thin film magnetic head elements arranged in a line on the row bar surface. The row bars are then machined to have a given gap depth and an air bearing surface and cut into each slider, as disclosed in JPA3-295017.

According to JPA3-295017, 3 inch-dia., 4.0 to 4.6 mm-thick substrate wafers are used to obtain 3.2 mm-long magnetic head sliders. When slicing a substrate wafer, on an end face, that is, a front side surface of which hundreds of thin film magnetic head elements have been formed, into row bars, a large number of grooves are provided on the front side surface of the substrate wafer by scribing the row bar from the front side surface along the width of the row bar with a small thickness of the other end face, that is, the back side surface of the substrate wafer, left uncut so as to prevent the row bars from separating apart. After that, grinding is performed from the back side surface of the substrate wafer to reach the aforementioned grooves, and the wafer is separated into row bars.

As a magnetoresistive thin film magnetic head which combines a magnetoresistive reproducing element and an inductive recording element has been put into practical applications, recording density has been remarkably improved. With increases in recording density, the size of the thin film magnetic head slider has also been rapidly reduced; the length of the slider has been reduced from 3.2 mm (70%) to 2.0 mm (50%), to 1.25 mm (30%), and even to 1 mm (25%) or less. The percent figures in parentheses are designations used in IDEMA standards. The thin film magnetic head slider has been reduced substantially not only in length but in width and thickness.

With decreases in the length of the slider, the thickness of the substrate wafer used has also been reduced. In JPA3-295017, a substrate wafer of 4.0 to 4.6 mm in thickness was used to fabricate a 3.2-mm (70%) slider, whereas a 2.0 mm-thick substrate wafer was used to fabricate a 1.25-mm (30%) slider in JPA8-241514. It is quite natural in terms of improved material yields to use a thinner substrate wafer to fabricate a shorter slider.

The thin film deposition process for forming thin film magnetic head elements includes photolithography, sputtering, ion milling, plating, etc. Since these treatments are usually carried out on each substrate wafer, man-hours for a substrate wafer remain almost the same, independent of the size of wafer. Increasing the size of a substrate wafer, therefore, offers an advantage of increasing the number of thin film magnetic heads produced from a single substrate wafer. When a substrate wafer of 6 inches in diameter is used, for example, the area of the wafer from which thin film magnetic heads can be manufactured is quadrupled in a simple calculation. In other words, about four times as many as thin film magnetic heads can be manufactured with almost the same man-hours. Thus, the size of the thin film wafer used in the manufacture of thin film magnetic heads has been increased from the conventional 3 inches to 4 inches, to 5 inches, and then to 6 inches. From a substrate wafer of 6 inches in diameter, for example, 7,000 to 9,000 pieces of 50% sliders or 15,000 to 20,000 pieces of 30% sliders can be manufactured.

In this way, the larger the diameter of substrate wafers, the thinner the become in thickness. As substrate wafers become larger in diameter and thinner in thickness, the substrates tend to be bent materially, leading to deterioration in levelness, posing a big obstacle in the formation of thin film magnetic head elements. The bending of the substrate may change the exposure focal distance of the photoresist, and change the local shape of the photoresist. When a mechanical grinding and/or lapping process is included in the manufacturing process of thin film magnetic head elements, the bending of the substrate may lower grinding and/or lapping accuracy.

Worsened grinding and/or lapping accuracy poses no problem in fabricating sliders, using a substrate wafer of about 3 inches in diameter. Fabricating 3.2 mm-long sliders using a 3 inch-dia. substrate wafer, as in JPA3-295017, poses no problem. In JPA8-241514, thin film wafers as thin as 2.0 mm are used, and their diameter is not shown. But, the diameter of the substrate wafer used is considered to be 3 inches judging from the fact that the length of row bars as the intermediate product is 50 mm. Since the bending of the substrate wafer does not cause any problem so long as a 3 inch-dia. substrate wafer is used, JPA8-241514 discusses only countermeasures for the bending of row bars caused after they were subjected to subsequent processing.

Thin film magnetic head elements are usually manufactured in thousands to ten thousands at a time by sequentially laminating thin films on a substrate wafer using the thin film deposition process. For this reason, even when part of the magnetic head elements on a single substrate wafer become defective, the manufacturing process is continued all the way through the final stage without removing the defective part. The defective part of the thin film magnetic heads is removed only after individual thin film magnetic head sliders have been finished by cutting row bars. To facilitate identifying individual sliders, including defective sliders, a marker representing the identification number of each sliders is provided on the substrate surface on which the element is formed, that is, the trailing side surface of slider. On the end surface opposite to the element forming surface of the slider, i.e. the leading side surface, normally provided are wafer and manufacturing lot numbers using the laser marking method. Since the manufacturing history and the location on the substrate wafer of each thin film magnetic head slider can be identified with these laser marks and the identification number on the element forming surface, the defective sliders can be easily removed, and the cause of defects can be easily detected and analyzed.

According to the process disclosed in JPA3-295017, row bars are fabricated by scribing many grooves in advance on a substrate wafer on which thin film magnetic head elements were formed, and grinding and/or lapping the back side surface. In the process disclosed in JPA8-241514, row bars having a slightly greater width than the length of the slider are fabricated by cutting a substrate wafer on which thin film magnetic head elements were formed, and then the surface of the row bar opposite to the surface on which the thin film magnetic heads were formed, that is, the leading surface of slider, is cut for removal. In these prior-art processes, wafer and manufacturing lot numbers and other markers have had to be provided on the leading side surface of slider, that is, the surface of slider opposite to the surface on which the elements were formed only after the substrate wafer containing thin film magnetic head elements has been fabricated into row bars, or into sliders. For this reason, much care has been required to control manufacturing lots so as to prevent manufacturing lots from being confused in providing markers with laser marking. Furthermore, laser marking in the state of row bars or sliders has involved a great amount of man-hours in handling them.

SUMMARY OF THE INVENTION

It is an object of this invention to provide a manufacturing method capable of manufacturing small thin film magnetic head sliders with high dimensional accuracy and high manufacturing yield.

It is another object of this invention to provide a manufacturing method of small thin film magnetic head sliders that can improve the accuracy of process control and quality control.

According to the manufacturing method of thin film magnetic head sliders of this invention, a plurality of thin film magnetic head sliders are formed by providing a non-magnetic substrate wafer of not less than 5 inches in diameter and of not less than 2.5 mm in thickness, forming an insulating layer on one end surface of the non-magnetic substrate wafer, forming a plurality of thin film magnetic head elements by thin film manufacturing processes on the insulating layer, grinding and/or lapping the other end surface (i.e. the back side surface) of the non-magnetic substrate wafer to produce the substrate wafer having a desired length of a magnetic head slider to be manufactured, cutting the substrate wafer in a direction perpendicular to the end surface of the substrate wafer to produce a plurality of row bars, each including a plurality of thin film magnetic head elements arranged in a line on a row bar surface, and machining the row bar to form a plurality of the thin film magnetic head sliders.

In this invention, it is preferable to use a non-magnetic substrate wafer of not less than 6 inches in diameter and of not less than 2.8 mm in thickness.

In this invention, it is preferable to have a process of grinding and/or lapping the back side surface of the non-magnetic substrate wafer, and providing markers by laser on the back side surface at opposite locations to the locations of the thin film magnetic head elements on the front side surface. It is preferable, furthermore, that the surface roughness of the back side surface of the substrate wafer be not more than 300 nm in Ra.

Ra values used here are measurements of centerline average roughness, Ra, measured with a feeler type surface roughness measuring instrument, as specified in JIS B0601.

DESCRIPTION OF THE PREFERRED EMBODIMENTS

In the following, the method of manufacturing thin film magnetic sliders according to this invention will be described in detail, referring to the accompanying drawings.

Figure 1:
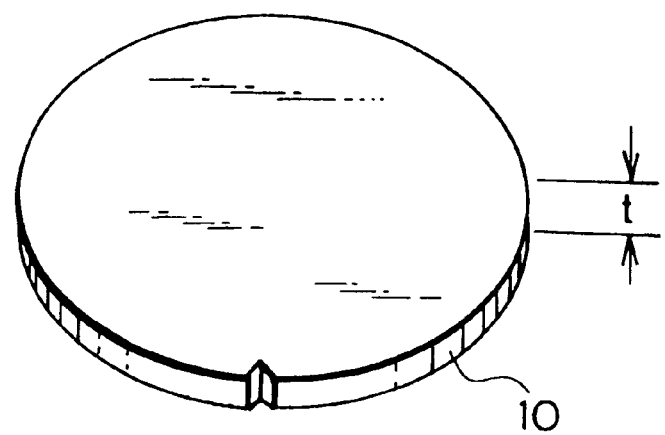
FIG. 1 is a perspective view of a substrate wafer used in this invention.

To begin with, a substrate wafer 10 as shown in FIG. 1 is prepared. The substrate wafer 10 is made of a non-magnetic ceramic material, such as alumina titanium carbide, and not less than 5 inches in diameter and not less than 2.5 mm in thickness; more preferably not less than 6 inches in diameter and not less than 2.8 mm in thickness. The flatness of the wafer 10 should preferably be not more than 0.5 $\mu$m. When a 4 inch×4 inch square substrate wafer is used, its thickness is not less than 2.5 mm. The flatness used here is a value obtained by measuring a substrate with a surface roughness measuring instrument in the diametrical direction for circular substrates, and in the diagonal direction for square ones. An insulating film 20, made of alumina, etc., is formed on an end surface of the substrate wafer 10. The insulating film 20 is deposited by sputtering to a thickness of 5 to 15 $\mu$m in an Ar atmosphere. On the insulating film 20 deposited on the front side surface of the substrate wafer 10 formed are arrays of thin film magnetic head elements 30 by the thin film deposition process. The term "thin film magnetic head" used in this specification refers to a composite thin film magnetic head combining an inductive head for recording and a magnetoresistive head for reproducing. Since a 6 inch-dia. substrate wafer has an area for forming thin film magnetic head elements of about 100 mm×100 mm, 200 to 500 rows of scores to hundreds of thin film magnetic head elements can be formed for 30% thin film magnetic head sliders on a substrate wafer of the same size. The number of thin film magnetic head elements that can be formed depends on the size of a substrate wafer, thin film deposition equipment, the size of thin film magnetic head elements being formed, and the distance between elements.

Figure 2:
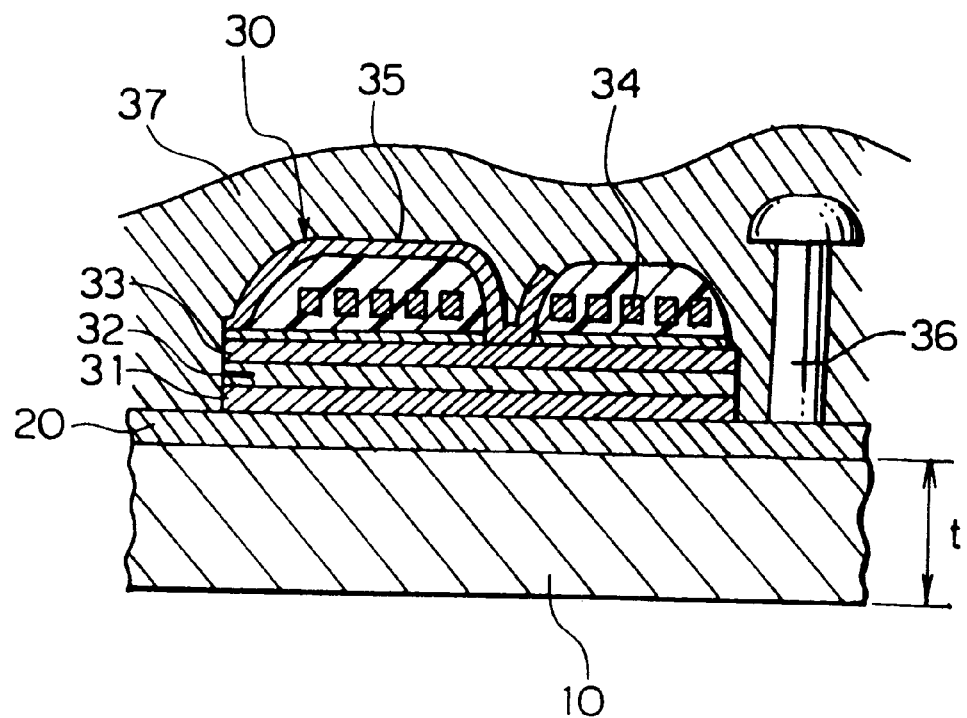
FIG. 2 is a cross-sectional view of a substrate wafer on which thin film magnetic head elements have been formed.
Figure 3:
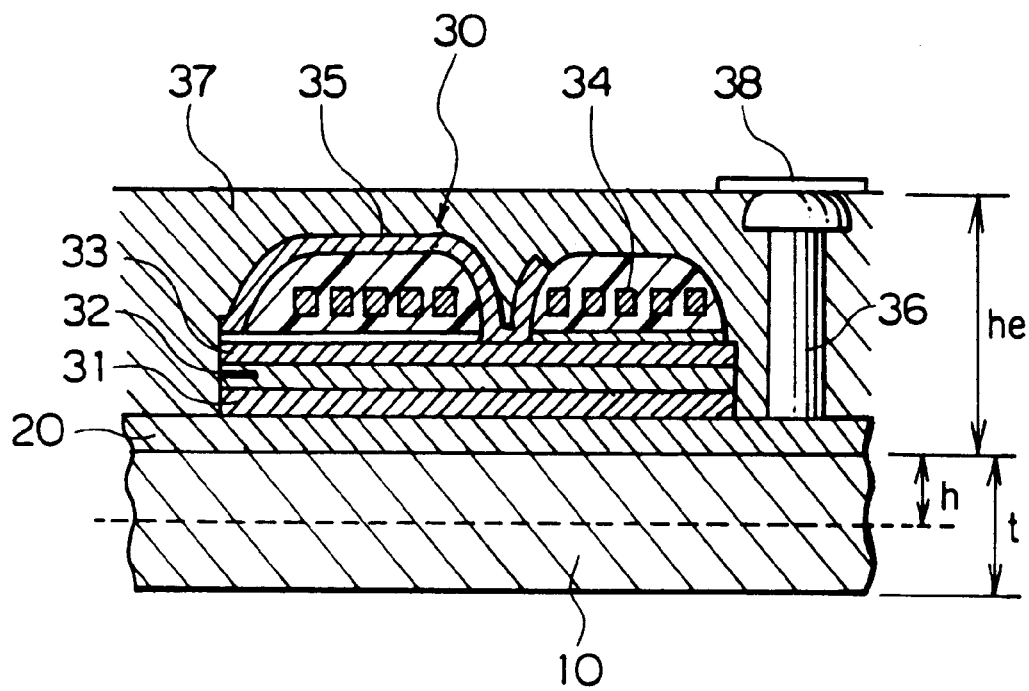
FIG. 3 is a cross-sectional view of a substrate wafer on which thin film magnetic head elements have been formed to help explain the grinding depth of the substrate wafer.

The thin film magnetic head element 30 shown in FIGS. 2 and 3 is formed by laminating a lower shield 31 made of a metallic magnetic film, a magnetoresistive element (MR element) 32, a lower magnetic core 33, made of a metallic magnetic film, that also serves as an upper shield, a coil 34, an upper magnetic core 35, a conductive stud 36, and a protective layer 37 made of alumina, etc.

Non-magnetic layers that serve as reproducing gap layers for the MR element 32 are provided between the lower shield 31 and the lower magnetic core 33. To form a magnetic gap for recording with the upper magnetic core 35, an alumina layer is normally formed on the lower magnetic core 33. A non-magnetic insulating resin is provided between the alumina layer and the upper magnetic core 35 in such a manner to enclose the coil 34. Though only one conductive stud 36 is shown in the figure, at least 2 to 6 conductive studs 36 are usually provided. Conductive leads are formed to connect between the terminals of the MR element 32 and the studs, and between the terminals of the coil 34 and the studs. Since the accompanying drawings are simplified for ease of understanding, some of these parts are omitted.

The protective layer 37 is ground and/or lapped so that heads of the conductive studs 36 can be exposed on the protective layer 37 for connection to wires, and gold pads 38 are formed on the stud heads on the trailing side surface of slider.

Thin film magnetic head elements are fabricated with thin film deposition processes, such as photolithography, sputtering, ion milling and plating. Explanation of these fabricating methods are omitted here since they are obvious to those skilled in the art, and not always necessary to understand this invention.

Next, the back end surface of the substrate wafer 10, opposite to the surface on which the thin film magnetic head elements 30 are formed is ground and/or lapped so that the thickness of the wafer becomes equal to the length of the thin film magnetic head slider being formed. The original thickness of the wafer is shown by t in FIGS. 2 and 3, and the thickness of the wafer after grinding by h in FIG. 3. To obtain a 30% slider, for example, the substrate wafer is ground and/or lapped to a thickness h of 1.25 mm because the length of the magnetic head slider is 1.25 mm. As the thickness he of the thin film magnetic head element is of the order of 20 µm, whether the thickness he of the thin film magnetic head element should be included in the substrate wafer thickness h poses no problem.

Gold pads 38 may be formed either before or after the substrate wafer 10 is ground and/or lapped to a thickness h.

After the back side surface of the substrate wafer 10 has been ground and/or lapped, markers 40 indicating wafer and manufacturing lot numbers, etc. are printed by laser at the locations on the back side surface corresponding to the locations of the thin film magnetic head elements 30 formed on the front side surface. As the markers 40 are printed in very small fonts, the roughness of the finished surface of the substrate wafer after grinding and/or lapping should preferably be not more than 300 nm in Ra.

Figure 6:
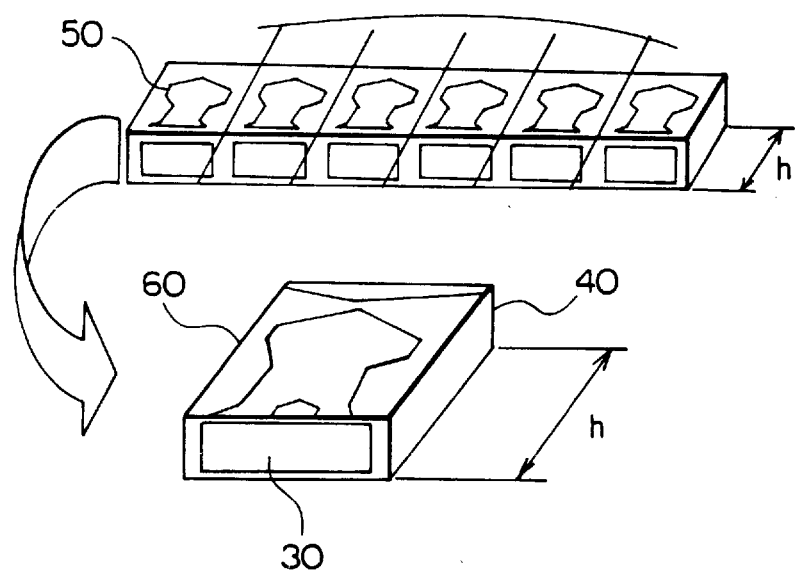
FIG. 6 is a perspective view of assistance in explaining the fabrication of row bars into thin film magnetic head sliders as finished products according to this invention.

Next, the substrate wafer 10 is divided into rectangular blocks (row bars) 50 by cutting the wafer along the rows of the thin film magnetic head elements 30 in such a manner that a row bar includes a row of thin film magnetic head elements. The cutting thickness of the row bar is set to an intended thickness of the thin film magnetic head slider 60, or 0.3 mm for a 30% slider, for example. The mounting surface of a gimbal is formed, and the gap depth of the surface facing the magnetic disk, that is, the air bearing surface (ABS) is fabricated by grinding and/or lapping the cut surface of the row bar obtained. A diamond-like carbon film is then deposited on the ABS, and the ABS is fabricated to desired geometry by ion milling, etc. The diamond-like carbon film may be provided after the fabrication of the ABS. Thin film magnetic head sliders 60 as the final products as shown in FIG. 6 are obtained by cutting the row bar 50.

Figure 4:
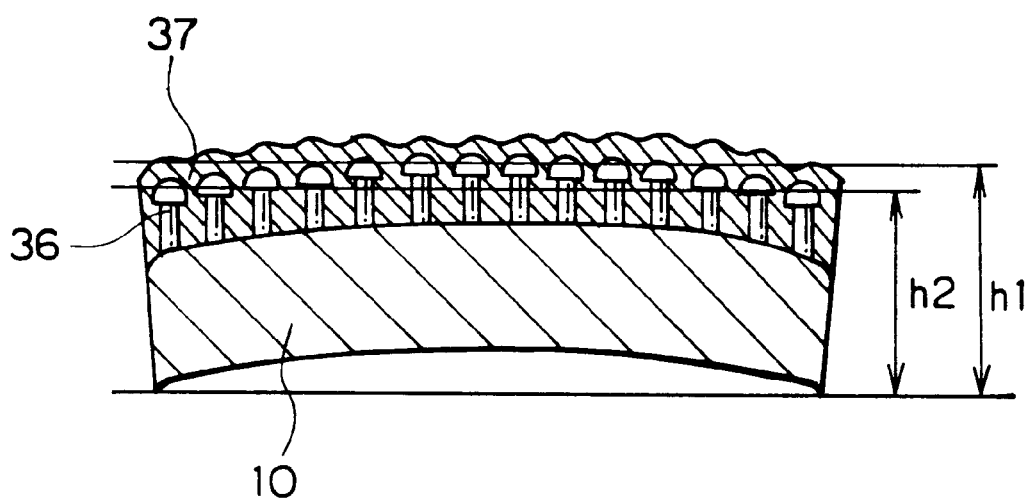
FIG. 4 is a cross-sectional view of a substrate wafer to help explain the grinding depth of the protective layer.
Figure 5:
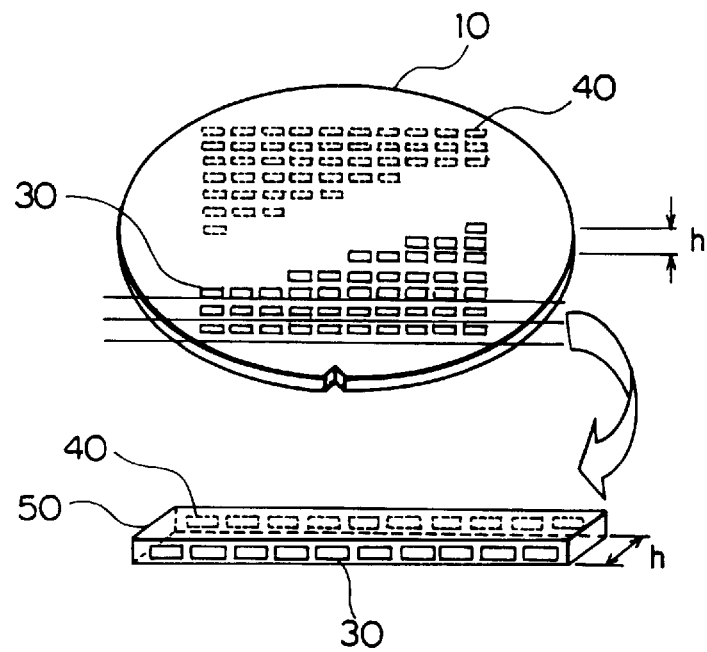
FIG. 5 is a perspective view of assistance in explaining the formation of markers and the fabrication of row bars according to this invention.

FIG. 4 shows the state where the substrate wafer 10 used was bent during the manufacturing process of the thin film magnetic head slider 60, as described above. In the figure, thin film magnetic head elements are formed on the substrate wafer 10 and coated with a protective layer 37, such as alumina. The protective layer 37 is ground and/or lapped so that heads of the conductive studs 36 appear on the protective layer 37. The substrate wafer 10 tends to be bent when the thin film magnetic head elements 30 and the protective layer 37 are formed on wafer 10, as shown in FIG. 4. The thinner the substrate wafer, the severer becomes the bend, and the larger the diameter of the wafer the severer becomes the bend. When the substrate wafer 10 is bent, the upper surface of the protective layer 37 is also bent. As the protective layer 37 is ground and/or lapped to a depth h1 in FIG. 4, the conductive studs near the center of the substrate appear on the protective layer 37, but the conductive studs near the peripheral part of the substrate are still covered with the protective layer. This makes it impossible to proceed to the next process of providing gold pads. If the protective layer is further ground and/or lapped to a depth h2, over-grinding of the conductive studs near the center of the substrate would result. In this way, a bend on the substrate would lower manufacturing yield when manufacturing thin film magnetic head sliders.

This invention can minimize the bending of the substrate wafer by using a substrate wafer of not less than 2.5 mm in thickness for wafers of 5 inches or more diameter, and a wafer of not less than 2.8 mm for wafers of 6 inches or more diameter, thereby increasing the manufacturing yield of thin film magnetic head sliders.

Experiment

Five pieces each of 6 inch-dia. alumina titanium carbide substrate wafers of 2.8 mm, 2.5 mm and 1.25 mm in thickness were prepared. The bend of these substrate wafers before experiment was 0.5 µm.

One end surface of these substrate wafers was coated with alumina, on which 20,000 pieces of thin film magnetic head elements for 30% sliders were formed and then covered with alumina as a protective layer. The thickness of the thin film magnetic head elements, including the alumina protective layer, was about 20 µm.

TABLE 1

| Thickness of substrate wafers | Bending | Yield |
|---|---|---|
| 2.8 mm | 1 to 2.1 µm | 100% |
| 2.5 mm | 2.5 to 5.8 µm | 95% |
| 1.25 mm | 6.1 to 13.2 µm | 45% |

In this way, the bending of the substrate wafer after the thin film magnetic head elements were formed on it became pronounced, as shown in TABLE 1. These bends were measured on the back side surface of the substrate wafer because they were hard to measure on the surface on which the thin film magnetic head elements were formed due to severe surface irregularities. The thicker the substrate wafer the less becomes the bending of the substrate wafer.

The slider-manufacturing yields with these substrate wafers after the processing of polishing the alumina protective layer to expose the conductive studs on the surface are also given in the table. Those substrate wafers on which the conductive studs failed to be exposed on the surface due to the insufficient removal of the alumina layer on them, or the heads of the studs were lost due to the excess removal of the alumina layer were rated as rejects. It can be concluded from these observations that substrate wafers of 6 inches in diameter should preferably have a thickness of not less than 2.8 mm.

As described above, this invention has the following advantages.

When small thin film magnetic head sliders are manufactured using 5 inch-dia. substrate wafers of not less than 2.5 mm in thickness, and 6 inch-dia. substrate wafers of not less than 2.8 mm in thickness, the substrate wafers after thin film magnetic head elements have been formed on them are bent less, resulting in increased slider-manufacturing yields.

Since substrate wafers are ground and/or lapped to a thickness equal to the desired slider length after thin film magnetic head elements have been formed, many sliders can be machined at a time to a desired slider length. Furthermore, polishing process used in this invention is free of saw marks on the machined surface, making markers more legible.

A laser marking process used in this invention allows markers to be printed on many sliders at a time. Markers provided on substrate wafers before they are cut into row bars help facilitate process control and quality control.

This invention, in which substrate wafers are cut into row bars only after machined to a thickness equal to a desired slider length, help reduce wafer cutting time.

What is claimed is:

1. A manufacturing process to manufacture a plurality of thin film magnetic head sliders comprising:

providing a non-magnetic substrate wafer of not less than 5 inches in diameter and of not less than 2.5 mm in thickness, the thickness being more than a desired slider length for the magnetic head sliders of 1.25 mm, 1.0 mm or less to be manufactured;

forming an insulating layer on a first end surface of the non-magnetic substrate wafer;

forming a plurality of thin film magnetic head elements on the insulating layer by a thin film manufacturing process;

grinding and/or lapping a second end surface of the non-magnetic substrate wafer opposite the first end surface to a thickness equal to the desired slider length of the magnetic head sliders;

cutting the substrate wafer in a direction perpendicular to the first end surface of the substrate wafer to produce a plurality of row bars, each including a plurality of thin film magnetic head elements arranged in a line on a row bar surface; and machining the row bar to form the plurality of thin film magnetic head sliders.

2. The manufacturing process of thin film magnetic head sliders as set forth in claim 1, wherein a non-magnetic substrate wafer of not less than 6 inches in diameter and of not less than 2.8 mm in thickness is provided, the thickness being more than a desired slider length of the magnetic head sliders to be manufactured.

3. The manufacturing process of thin film magnetic head sliders as set forth in claim 2 further comprising:

printing markers by laser on the second end surface of the non-magnetic substrate wafer having the desired slider length at locations opposite to the locations of the thin film magnetic head elements after grinding and/or lapping.

4. The manufacturing process of thin film magnetic head sliders as set forth in claim 3, wherein the second end surface of the non-magnetic substrate wafer is less than 300 nm in roughness after grinding and/or lapping.

* * * * *

UNITED STATES PATENT AND TRADEMARK OFFICE
CERTIFICATE OF CORRECTION

PATENT NO. : 6,202,289 B1
DATED : March 20, 2001
INVENTOR(S) : Kuniaki Yoshimura et al.

It is certified that error appears in the above-identified patent and that said Letters Patent is hereby corrected as shown below:

<u>Title page,</u>
Item [75], Inventors: change "Ohyahonmachi" to -- Mohka --.

<u>Column 2,</u>
Line 19, change "the" to -- they --.

<u>Column 3,</u>
Lines 50-53, replace with -- film magnetic head elements arranged in a line on a row bar surface, and machining the row bar to form a plurality of the thin film magnetic head sliders. --

<u>Column 6,</u>
Line 29, change "Experiment" to -- EXPERIMENT --.

Signed and Sealed this

Thirtieth Day of July, 2002

*Attest:*

JAMES E. ROGAN
*Director of the United States Patent and Trademark Office*

*Attesting Officer*